UNITED STATES PATENT OFFICE.

CHARLES A. DOREMUS, OF NEW YORK, N. Y., ASSIGNOR OF ONE-HALF TO JOHN SHERMAN HOYT, OF DARIEN, CONNECTICUT.

PROCESS FOR OBTAINING ALUMINIUM FLUORID.

1,237,488.  Specification of Letters Patent.  Patented Aug. 21, 1917.

No Drawing.  Application filed February 21, 1913.  Serial No. 749,806.

*To all whom it may concern:*

Be it known that I, CHARLES A. DOREMUS, a citizen of the United States, and a resident of New York, county of New York, and State of New York, have invented certain new and useful Improvements in Processes for Obtaining Aluminium Fluorid, of which the following is a specification.

My invention relates to improvements in processes for obtaining aluminium fluorid, and the main object of my invention is to provide a process by which aluminium fluorid may be produced from feldspar or other refractory double silicates of like nature. A further object of my invention is to provide a process in which valuable by-products are obtained such as silica, and which may be advantageously used in conjunction with other processes for obtaining useful products from feldspar, etc.

In carrying out my improved process in its best form, I treat finely powdered orthoclase or the double silicate of potassium and aluminium $(K_2O, Al_2O_3, 6SiO_2)$ with aqueous hydrofluoric acid in the proportions of 20 parts by weight of the feldspar to 129 parts of the aqueous acid containing 20% of real acid at a temperature of about 50° C., stirring the mixture thoroughly. The proportions will, of course, vary with different feldspars and silicates, according to the percentages of metals present, and also according to the kind of fluorin acid used. The mixture becomes further heated by the chemical actions which take place, and there results in a short time a complete decomposition of the feldspar. I then cool the mass somewhat and filter out the insoluble potassium silicofluorid, leaving aluminium fluorid usually mixed with hydrofluosilicic acid in solution. The insoluble products may be treated in any suitable way to obtain useful potassium products. The soluble aluminium fluorid alone, or mixed with hydrofluosilicic acid, is separated from the insoluble fluosilicate of the alkali metals by decantation or filtration. This solution having an acid reaction is then neutralized, preferably when hot, by the addition of an aluminous material, such as bauxite or kaolin.

The kaolin may be calcined, some kaolins reacting more readily after calcination. When sufficient aluminous material is added all the silica originally present in the solution and that added by the use of the aluminous ore is separated in an insoluble state and may be removed from the liquor by sedimentation or filtration. The liquor then is practically a solution of aluminium fluorid. This substance is then obtained, if desired, in a solid state from the solution by either the evaporation of the water or by crystallization. In the latter case the amount of water of crystallization varies with the conditions under which the solution of aluminium fluorid is crystallized. Though these several forms of crystalline aluminium fluorid vary in solubility and in other properties, they all yield anhydrous aluminium fluorid when heated.

When the aluminium fluorid is obtained by either evaporation of the water from the solution, or by crystallization, the mother liquor resulting is either returned to the process or suitably treated to recover any valuable constituents.

The silica remaining on the filter, or secured by sedimentation, is in a finely divided condition and hydrated. Its purity is dependent on the character of the ores used in the process. When heated it is rendered anhydrous. It is therefore suited, through its ready solubility in alkalis and through other properties to various useful purposes, and in the anhydrous state is useful in other manufactures. The weight of precipitated silica produced relatively to the weight of aluminium fluorid, assumed as anhydrous for comparison, varies according to the proportion of silicium present in the solution of aluminium fluorid, the presence of hydrofluosilicic acid therein, and the amount of silica present in the aluminous material used to neutralize the aluminium fluorid solution. Thus kaolin introduces more silica than bauxite.

Although I have described my improvements with respect to certain embodiments with great detail, nevertheless I do not desire to be limited to such details except as clearly specified in the appended claims, since many changes and modifications may well be made without departing from the spirit and scope of my invention in its broader aspects.

Having fully and clearly described my improvements, what I claim as new and desire to secure by Letters Patent, is:

1. The process of making aluminium fluorid and silica from refractory potash and soda bearing feldspars, which consists in treating the feldspar with aqueous hydrofluoric acid to decompose the feldspar and form an insoluble fluosilicate from the alkali of the feldspar and a soluble fluorid of aluminium from the alumina of the feldspar, then separating the solution containing aluminium fluorid and any hydrofluosilicic acid, from the insoluble fluosilicate, and then treating the solution while hot with aluminous material until it is neutral, separating the precipitated silica from the aluminium fluorid solution and recovering the aluminium fluorid in a solid state.

2. The process of making aluminium fluorid, which consists in treating refractory double silicates bearing aluminium with an excess of fluorin acid to decompose the double silicate and form an insoluble fluosilicate from the alkali of the double silicate, and a soluble fluorid of aluminium from the alumina of the double silicate, separating the insoluble fluosilicate, and then treating the solution with aluminous material and separating the precipitated silicious material from the soluble aluminium fluorid to recover the aluminium fluorid.

3. The process of making aluminium fluorid from refractory double silicates bearing aluminium, which consists in treating the double silicate with an aqueous fluorin acid to decompose the double silicate and form an insoluble fluosilicate from the alkali of the double silicate and a solution of fluorid of aluminium from the alumina of the double silicate, separating out the insoluble fluosilicate, and then adding aluminous material to the solution of aluminium fluorid to precipitate silica, and separating the precipitate from the soluble aluminium fluorid to recover the latter.

4. The process of making aluminium fluorid from refractory double silicates bearing aluminium, which consists of treating the double silicate with a fluorin acid to decompose the double silicate and form an insoluble fluosilicate from the alkali of the feldspar and a soluble fluorid of aluminium from the alumina of the feldspar and then separating the insoluble fluosilicate from the aluminium fluorid.

5. The process of making aluminium fluorid from refractory double silicates bearing aluminium, which consists in treating the double silicate with a hydrofluoric acid of about twenty per cent. strength, to decompose the double silicate and form an insoluble fluosilicate from the alkali of the feldspar and a soluble fluorid of aluminium from the alumina of the felspar and then separating the insoluble fluosilicate from the aluminium fluorid.

6. Process of making aluminium fluorid and silica from refractory potash and soda bearing feldspars which consists in treating the feldspar with an aqueous hydrofluoric acid, of about twenty per cent. strength, to decompose the feldspar and form an insoluble fluosilicate from the alkali of the feldspar and a soluble fluorid of aluminium from the alumina of the feldspar, then separating the solution containing the aluminium fluorid and any hydrofluoric acid from the insoluble fluosilicate and then treating the solution of aluminium fluorid with aluminous material to precipitate silicate from the solution and then recovering the aluminium fluorid in a solid state.

7. The process of making aluminium fluorid from refractory double silicates bearing aluminium, which consists in treating the double silicate with an aqueous fluorin acid of about twenty per cent. strength to thereby directly produce aluminium fluorid and hydrofluosilicic acid and then separating the solution containing aluminium fluorid and any hydrofluosilicic acid from the alkali fluosilicate, then adding aluminous material to precepitate silicate, and separating the precipitate from the soluble aluminium fluorid to recover the latter.

In testimony whereof I have signed my name to this specification, in the presence of two subscribing witnesses.

CHARLES A. DOREMUS.

Witnesses:
GORHAM CROSBY,
EDWIN SEGER.